United States Patent [19]

Rice

[11] 4,226,347
[45] Oct. 7, 1980

[54] TOOL KIT AND PROTECTIVE CUSHION

[75] Inventor: William H. Rice, Bryn Mawr, Pa.

[73] Assignee: Blavat Advertizing, Inc., Erdenheim, Pa.

[21] Appl. No.: 33,878

[22] Filed: Apr. 27, 1979

[51] Int. Cl.³ .......................... B62J 11/00; B62J 27/00
[52] U.S. Cl. ...................................... 224/35; 206/376; 224/36
[58] Field of Search .............. 224/35, 32 R, 31, 30 R, 224/30 A, 36, 273, 34, 39 R, 41, 42.42 R, 42.42 A, 42.45 R, 42.45 B, 42.46 R; 280/202, 289 R, 289 WC, 289 A, 289 H; 206/315 R, 349, 372, 373, 376, 377, 378

[56] References Cited

U.S. PATENT DOCUMENTS

| 516,724 | 3/1894 | Hunt | 224/35 |
|---|---|---|---|
| 553,786 | 1/1896 | Mueller | 224/35 |
| 570,923 | 11/1896 | Goodspeed | 224/35 |
| 579,123 | 3/1897 | Bischoff | 224/35 |
| 2,960,263 | 11/1960 | Goddard | 224/274 |

*Primary Examiner*—Robert J. Spar
*Assistant Examiner*—Jerold M. Forsberg
*Attorney, Agent, or Firm*—Stuart E. Beck

[57] ABSTRACT

A tool kit and protective cushion which can be connected to the saddle bar of a bicycle. The device is comprised of relatively soft material with recesses formed therein in which tools can be received. The material surrounds the saddle bar. This protects the thighs of the rider as the bike is being peddled. Additionally, should the rider slip off the seat, the groin area is also protected.

9 Claims, 5 Drawing Figures

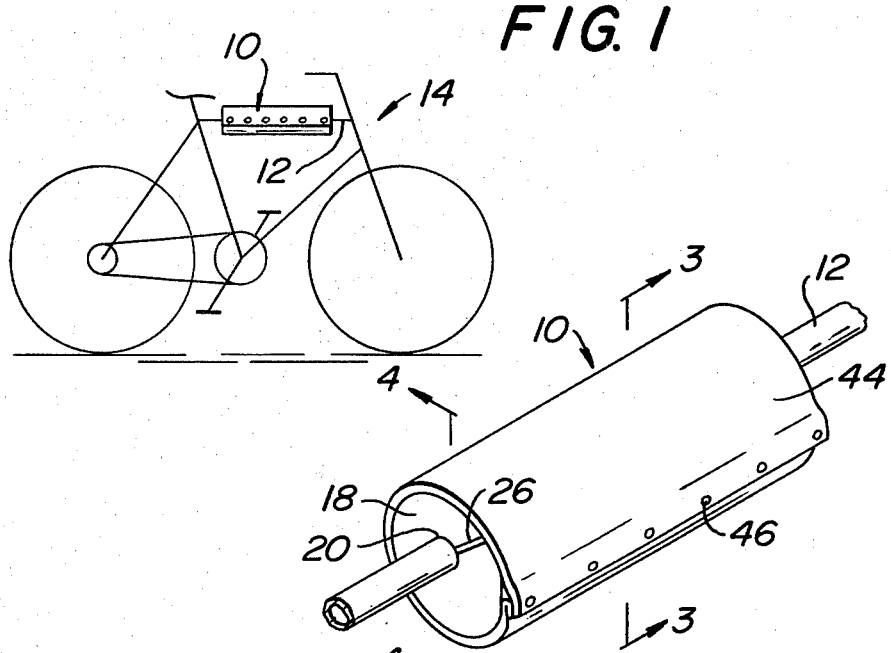
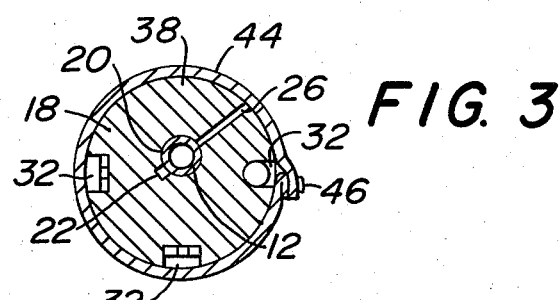
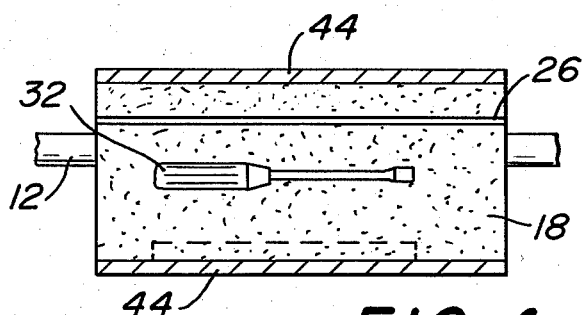
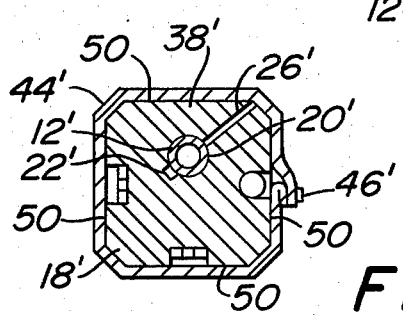

TOOL KIT AND PROTECTIVE CUSHION

This invention relates to a tool kit and protective cushion and more particularly to a tool kit and protective cushion which can be mounted on a bicycle.

It is desirable to provide for bicycles tool kits which are relatively light in weight and which can be connected to a portion of the bicycle frame. Such tool kits usually comprise a handful of tools such as pliers, wrenches, screw drivers, air pressure gauges and the like.

They are usually secured to the seat or they are mounted on a sling of some kind below the saddle bar or one of the other bars comprising the bicycle frame.

Over the years riders who have provided their bicycles with tool kits, have found then to be very convenient in connection with making minor repairs while on the road.

On the other hand, while riding, there is a tendency for the thighs of the rider to rub against the saddle bar and irritate that portion of the body. Over short distances and short periods of time, this is not significant. However, when the bicycles are used for touring over substantial distances and significant periods of time are involved, this chafing can develop into a major source of irritation which can substantially reduce the enjoyment experienced by the rider and interfere with pedalling the bicycle.

With the foregoing in mind, the invention described herein comprises a tool kit which can be mounted to a bar of a bicycle and which is constructed in such a way that the problem of chafing as mentioned above is relieved.

Generally, the invention relates to a tool kit and protective cushion for one of the bars of a bicycle frame which comprises an elongated hollow member which can be connected to the bar and which is comprised of a resilient relatively soft material to protect the groin and thighs of a rider. A plurality of recesses are provided in the outer wall of the member in which tools can be received. An outer cover for the kit is provided along with means for securing the cover thereto.

The invention can be more clearly understood from the following description of certain preferred forms thereof, together with the accompanying drawings, wherein similar reference characters denote similar elements throughout the several views and in which FIG. 1 is a side elevation view of a schematically drawn bicycle on one of the bars of which a tool kit and protective cushion is mounted.

FIG. 2 is a perspective view showing one presently preferred form of the invention.

FIG. 3 is a section view taken along line 3—3 of FIG. 2.

FIG. 4 is a section view taken along line 4—4 of FIG. 2.

FIG. 5 is a section view similar to FIG. 3, but taken through another embodiment of the invention.

Now referring to the drawing for a detailed description of the invention. FIG. 1 illustrates a device 10 constructed in accordance with the presently preferred form of the invention which is shown supported, in its preferred location, on the saddle bar 12 of a bicycle 14.

As best seen in FIGS. 2 and 3 the device comprises an elongated member 18 comprised of a suitable material which provides a yieldable, semi-rigid cushion which will keep its shape while at the same time providing a protective pad over the bar. A suitable member can be comprised of polyethylene foam or polyurethane foam, however, the precise type of material is not critical as will be apparent below. Preferably, member 18 is about 3 inches in diameter. However, its diameter could be larger or smaller. The limiting factor on increasing the diameter is interference with the rider, while the limiting factor on reducing the diameter is the loss of the recesses and cushioning. It is long enough to extend the length of the saddle bar 12, or whichever bar of the frame comprising the bicycle that it is mounted on.

Elongated member 18 may be provided with a longitudinally extending cylindrical opening 20. The opening 20 may be slightly above the center of member 18 and is of a suitable size to enable the member 18 to fit snugly over the bar 12. Its snugness cooperates with its length to restrain it from sliding lengthwise on the bar.

A longitudinally extending keyhole slot or notch 22 may be formed in the central opening 20 to provide a passage for the gearshift and brake cables on the bicycle where those cables are present.

Member 20 may include an elongated generally radially directed slot 26 extending the length of member 20 and extending between the inner and outer surfaces of the member. The slot 26 permits member 18 to be bent back over itself to enable it to be slipped over bar 12 so that the bar can be received in central opening 20. Because of the resilience of the material of which the central member is comprised, it will then return to its original configuration in which it surrounds bar 12.

As illustrated in FIGS. 2 to 4, the external configuration of the central member 18 is cylindrical.

As best seen in FIGS. 3 and 4, a plurality of recesses 32 are formed on the outer wall of the central member. The recesses 32 are elongated and extend lengthwise of member 18. Preferably their side walls and rear walls are shaped in the outline of the tool which is to be supported therein so that the tools will fit snugly in their respective recesses. This arrangement offers the advantage of reducing the likelihood that the tools will slip out or move within the recesses while the bicycle is being used. The recesses may be spaced around the outer wall of member 18, however, it is presently preferred that there be no recess at the upper portion 38 of the elongated member. This is because this portion will be facing upward when the device is mounted on the bar 12. Consequently, the rider will be protected against injury to the groin from bar 12 by the cushion at the upper portion of member 18. In this regard the fact that the opening 20 is above the center of member 18 will tend to cause the portion 38 to remain in an upwardly facing direction.

Additionally, the location of the tool recesses 32 in the other portions of member 18 will tend to urge them downward so that portion 38 is always facing upwardly.

A suitable cover 44 is provided for member 18. Preferably, the cover comprises a sheet of relatively thin material which can be wrapped tightly around the outer wall of member 18 and secured thereto.

Preferably, the sheet is comprised of a relatively stiff material such as a rigid vinyl so that it will not permit the tools to slip, while at the same time being flexible enough to be wrapped around member 18. The cover 44 may be secured on member 18 by suitable mutually engagable fastening means. Preferably, the fastening means may comprise snaps 46 extending along opposite edges of the cover 44.

When the cover is wrapped around member 18 the fastening means are brought into registry with each other and can then be brought into mutual engagement.

Referring now to FIG. 5, another form of the invention is illustrated in which member 18 is generally rectangular in its external configuration and is comprised of a plurality of outer walls 50.

In this embodiment of the invention the recesses 32' are located in the side and bottom walls 50 and the central opening 20', which is cylindrical as in the first embodiment, is located slightly above the center of the member 18'. This tends to cause the member to rotate so that portion 38' which is the portion of greatest padding, always faces upwardly.

In a manner similar to that explained above, a suitable cover 44' having suitable fastening means 46' may be provided for securing the tools in the recesses while the bike is being used.

Thus, what has been described is a tool kit and protective cushion which is simple to manufacture and install on a bicycle and which provides protection against injury for the rider.

While the invention has been described in connection with certain preferred forms and embodiments thereof, it is apparent that many further forms and embodiments will be obvious to those skilled in the art in view of the foregoing description. Thus, the scope of the invention should not be limited by the foregoing description, but, rather only by the scope of the claims appended hereto.

I claim:

1. A tool kit and protective cushion for a bar of a bicycle comprising an elongated hollow member, said member being comprised of a resilient material and including a relatively thick wall; said member including means for enabling it to be connected to the bar so that said member fits over the bar to protect the groin and thighs of a rider; a plurality of recesses disposed around the outer wall of said member and extending lengthwise along said member for receiving tools; a portion of said member not including recesses; said portion to be located at the top of the bar to provide a cushion if the rider slips off the seat; an outer cover for said kit, and means for securing said cover to said member to keep tools from falling from said recesses.

2. A tool kit and protective cushion as defined in claim 1 wherein said member is comprised of plastic and has a diameter of about 3 inches.

3. A tool kit and protective cushion as defined in claim 1 including a tool in each of said recesses, and each recess is formed in the outline of the tool therein so that each of said tools and their respective recesses fit closely together.

4. A tool kit and protective cushion as defined in claim 1 wherein said means for enabling said member to be connected to the bar comprises a slot connecting said inner and outer portions of said member, and said member is yieldable to enable it to be slipped over the bar.

5. A tool kit and protective cushion as defined in claim 4 wherein the inner portion of said member is cylindrical and said slot extends radially therefrom.

6. A tool kit and protective cushion as defined in claim 1 wherein said cover is comprised of a sheet of relatively stiff material, said sheet being large enough to be wrapped around said member whereby said recesses are covered.

7. A tool kit and protective cushion as defined in claim 6 wherein the opposite ends of said sheet include mutually engagable fastening means, and said fastening means cooperate to close said sheet on itself when it is wrapped around said member.

8. A tool kit and protective cushion as defined in claim 1 wherein the outer wall of said member is cylindrical.

9. A tool kit and protective cushion as defined in claim 1 wherein the outer wall of said member is rectangular in cross section.

* * * * *